June 10, 1947.  R. C. SANDERS, JR  2,422,134
DISTANCE INDICATOR
Filed March 29, 1943  2 Sheets-Sheet 1

Inventor
Royden C. Sanders, Jr.
By
Attorney

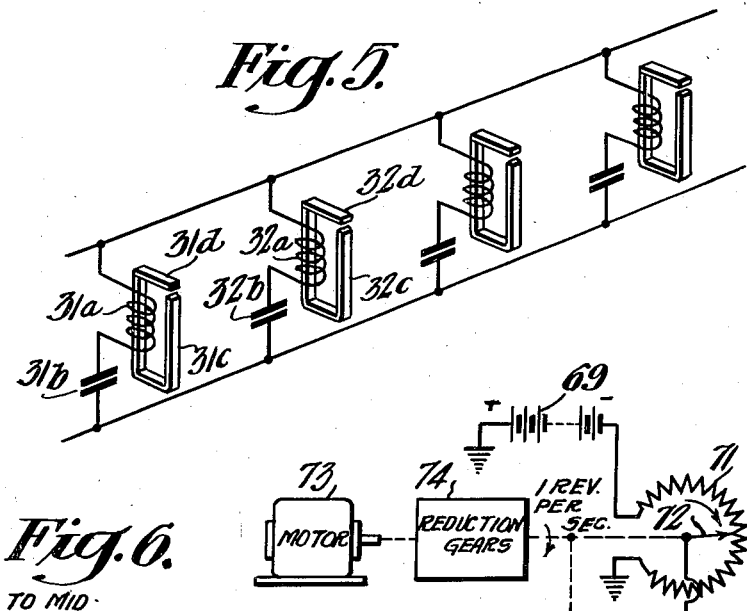
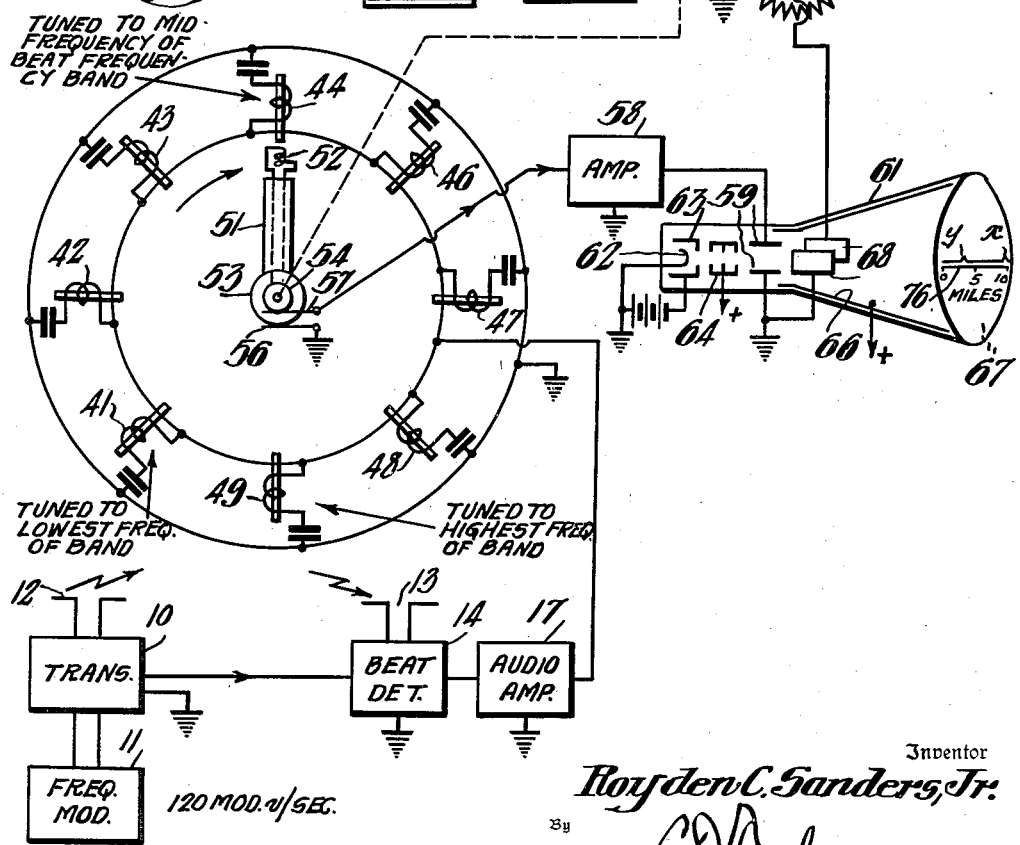

Patented June 10, 1947

2,422,134

UNITED STATES PATENT OFFICE 2,422,134

DISTANCE INDICATOR

Royden C. Sanders, Jr., Hightstown, N. J., assignor to Radio Corporation of America, a corporation of Delaware Application March 29, 1943, Serial No. 481,041

4 Claims. (Cl. 250—1.68)

My invention relates to distance measuring or object locating systems of the type employing a cyclically frequency-modulated radio wave that is transmitted to and reflected from the object to be located. The invention relates particularly to systems for indicating simultaneously the distances of a plurality of reflecting objects.

In the past, the reflection of frequency-modulated radio waves has been utilized for distance measuring where a single distance indication is to be obtained as in the case of an altimeter. Altimeters of this type are described in Bentley Patent 2,011,392 and in Espenschied Patent 2,045,071. The principle of operation is that radio waves have a known propagation speed so that if the reflected frequency-modulated wave is mixed in a beat detector with the directly applied frequency-modulated wave, the resulting beat frequency will be a measure of the distance to the reflecting object.

If the frequency-modulated wave is reflected from a plurality of objects there will be a corresponding plurality of beat frequencies in the beat detector output. An object of the present invention is to provide a suitable indication of these beat frequencies and, therefore, of the distances to the plurality of reflecting objects. A further object of the invention is to provide an improved indicator for frequency-modulated distance determining systems.

In accordance with the present invention, the distance indicator comprises a plurality of resonant circuits or mechanical elements tuned to different frequencies throughout the range of beat frequencies to be indicated. The resonant circuits or elements preferably are designed to have Q's which increase directly with their resonant frequencies whereby each circuit or element responds only to a given narrow band width of frequencies. In a preferred embodiment of the invention, the plurality of resonant circuits are associated with a rotating pick-up device which supplies an indication to a synchronized cathode ray indicator or the like each time the pick-up device rotates past an energized resonant circuit.

Figure 1:
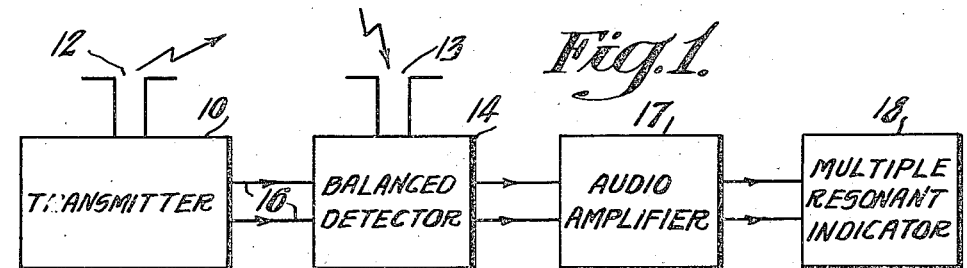
Figure 2:
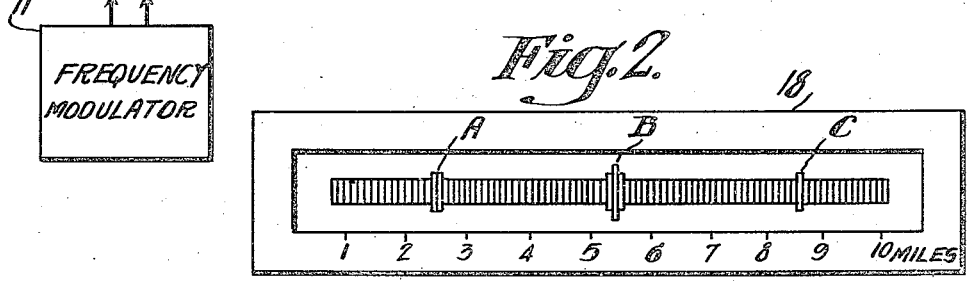
Figure 3:
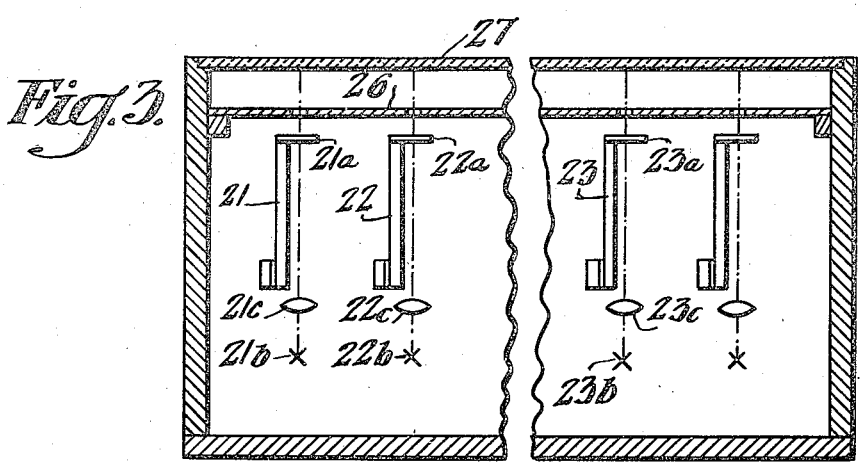
Figure 4:
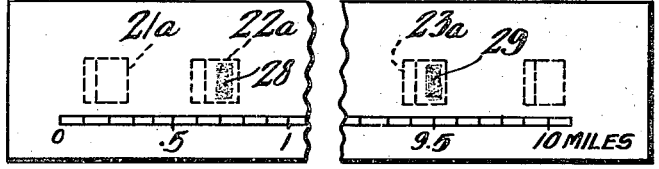

The invention will be better understood from the following description taken in connection with the accompanying drawing in which Figure 1 is a block diagram of a distance indicating system embodying my invention, Figure 2 is a front view of a tuned reed indicator that may be employed in the system of Fig. 1, Figure 3 is a plan view of a different type of tuned reed indicator, Figure 4 is a front view of the indicator shown in Fig. 3, Figure 5 is a diagram showing a form of resonant circuit indicator that may be employed in Fig. 1, and Figure 6 is a circuit and block diagram of a frequency-modulated distance determining system which includes a preferred form of my multiple resonant indicator.

In the several figures similar parts are indicated by similar reference characters.

Fig. 1 shows a distance indicator comprising a radio transmitter 10 which is cyclically frequency modulated by a suitable frequency modulator 11. The frequency-modulated wave is radiated from an antenna 12 and is picked up by a receiving antenna 13 after reflection from an object to be located and supplied to a beat detector 14 which preferably is of the balanced type. The frequency-modulated wave is also supplied directly to the detector 14 over conductors 16 whereby the "difference" or beat frequency appears in the detector output circuit. This part of the system may be the same as that described in my copending application Serial No. 445,720, filed June 4, 1942. The detector output signal is supplied through an audio amplifier 17 to a multiple resonant frequency indicator 18.

The indicator 18 may be of the tuned reed type similar to a Frahm frequency indicator. Fig. 2 is a view, looking towards the ends of the reeds in such an indicator, which shows the appearance of the tuned reeds at A, B and C when the indicator is energized by three different beat frequency signals representative of the distances to three reflecting objects. At A, the indication has been produced by a frequency lying between the resonant frequencies of the two vibrating reeds. At B, the energizing frequency is the frequency to which the middle vibrating reed is tuned. The middle reed vibrates at full amplitude while the adjacent reeds vibrate at low amplitudes. At C, the energizing frequency is the frequency to which the vibrating reed is tuned but is only of sufficient amplitude to vibrate the one reed.

In order that each tuned reed shall have the same band width response, it is preferred that the Q of the individual reeds shall increase in direct proportion to the frequency of response. If the indicator includes a large number of reeds, 100 for example, it may be desirable to evacuate the air around some of the high frequency reeds to obtain the proper Q. Any difference in amplitude of response of the reeds at different frequencies may be compensated by giving the audio amplifier 17 the proper frequency response characteristic. For example, it may be given a rising frequency response in order to provide more driving power for the comparatively stiff high frequency reeds.

If preferred, a tuned reed indicator of the type shown in Figs. 3 and 4 may be employed. In this construction the tuned reeds 21, 22, 23, etc., which vibrate normal to the plane of the paper, are provided with shutter portions 21a, 22a, 23a, etc. which are located opposite openings in an opaque plate 26. A plate 27 of ground glass or the like is located in front of the openings in the plate 26. Beams of light from light sources 21b, 22b, 23b and lens systems 21c, 22c, 23c will pass through the openings in plate 26 and produce spots of light on the plate 27 if the shutter portions 21a, 22a, etc. are vibrating past the corresponding openings. Such light spot indications are shown at 28 and 29 in Fig. 4 for the condition where two beat frequencies are vibrating the reeds 22 and 23, respectively.

Fig. 5 is a schematic diagram of another indicator that may be substituted for the indicator 18. In this construction a large number of series resonant circuits 31a—31b, 32a—32b, etc. are connected in parallel with each other and the parallel combination is connected to the audio amplifier output circuit. The inductance coils 31a, 32a, etc. are provided with magnetic cores 31c, 32c and with arms or reeds 31d, 32d which vibrate when the associated resonant circuit is energized. The distance indications will appear as shown in Fig. 2. In this design also, as well as in the embodiment next described, the Q's of the resonant circuits preferably are directly proportional to the resonant frequencies.

Fig. 6 illustrates a preferred embodiment of the invention in which the indicator comprises a plurality of series-resonant circuits 41, 42, 43, 44, 46, 47, 48 and 49 connected in parallel with each other just as in Fig. 5. The resonant circuits 41 to 49 are tuned to successively higher frequencies within the frequency band of the beat frequency output of the detector 14 and, preferably are much larger in number than illustrated in the drawing.

A rotatable arm 51 carries a pick-up coil 52 which is rotated past the resonant circuits 41 to 49 in succession and in such relation to them that any resonant circuit that is being energized or resonated by a beat frequency signal will energize the pick-up coil 52. Signal from the pick-up coil 52 is supplied through two collector rings 53 and 54 and their brushes 56 and 57 to an amplifier 58 which impresses the beat frequency signal upon the deflecting plates 59 of a cathode ray tube 61.

The cathode ray tube 61 may be of a conventional design comprising a cathode 62, a control grid 63, a first anode 64, a second anode 66 and a fluorescent screen 67 coated on the end of the tube envelope. The tube 61 contains a pair of deflecting plates 68 for deflecting the cathode ray horizontally in synchronism with the rotation of the pick-up coil 52. The horizontal deflecting voltage for the plates 68 may be obtained, for example, from a battery 69 which has a potentiometer 71 connected thereacross. A potentiometer arm 72, to which one of the deflecting plates 68 is connected, is rotated in synchronism with the rotation of the pick-up coil arm 51, both arms being rotated by a motor 73 through reduction gears 74 at a low speed, such as a speed of one rotation per second.

It will be seen that the successive positions of the cathode ray, as it is swept horizontally across the fluorescent screen, correspond to the successive positions of the pick-up arm and, therefore, to the resonant frequencies, respectively, of the tuned circuits 41 to 49. Thus, an indication $x$ at the extreme right-hand end of the horizontal sweep, for example, shows that the pick-up coil 52 has picked up energy from the resonant circuit 49 which is tuned to the highest of the beat frequencies to be indicated. This means that the output of detector 14 includes the beat frequency to which the circuit 49 is tuned. Since this beat frequency corresponds to a certain distance from the transmitter to the reflecting object, 10 miles for example, this distance may be marked under the cathode ray indication $x$ on a scale 76 adjacent to the horizontal deflection axis. Thus, it is evident that the scale 76 may be calibrated for the distance range through which the equipment is designed to function whereby any other cathode ray indication, such as the indication $y$, shows the distance to the reflecting object producing the indication.

I claim as my invention:

1. A distance indicating system comprising means for transmitting a cyclically frequency modulated radio wave, means for receiving said wave after reflection from objects that are unknown distances from the transmitting means, a beat frequency detector, means for supplying to said detector both said reflected wave and a frequency modulated wave direct from the transmitting means whereby the detector output contains signals having beat frequencies corresponding to said unknown distances, and a multiple resonant frequency indicator connected to receive said detector output, said indicator comprising a plurality of resonant units each tuned to a different frequency within the band of beat frequencies covering the operating range of the system, a pick-up device and means for moving it past said resonant units successively, an indicating scale, means for producing relative movement between an indicating means and said scale in synchronism with the movement of said pick-up device, and means for supplying signal from said pick-up device to said indicating means.

2. A distance indicating system comprising means for transmitting a cyclically frequency modulated radio wave, means for receiving said wave after reflection from objects that are unknown distances from the transmitting means, a beat frequency detector, means for supplying to said detector both said reflected wave and a frequency modulated wave direct from the transmitting means whereby the detector output contains signals having beat frequencies corresponding to said unknown distances, and a multiple resonant frequency indicator connected to receive said detector output, said indicator comprising a plurality of series resonant circuits connected in parallel with each other and each tuned to a different frequency within the band of beat frequencies covering the operating range of the system, a pick-up coil, means for moving said coil past said resonant units successively, an indicating scale, means for producing relative movement between an indicating means and said scale in synchronism with the movement of said pick-up coil, and means for supplying signal from said pick-up coil to said indicating means.

3. A distance indicating system comprising means for transmitting a cyclically frequency modulated radio wave, means for receiving said wave after reflection from objects that are unknown distances from the transmitting means, a beat frequency detector, means for supplying to said detector both said reflected wave and a frequency modulated wave direct from the transmitting means whereby the detector output contains signals having beat frequencies corresponding to said unknown distances, and a multiple resonant frequency indicator connected to receive said detector output, said indicator comprising a plurality of resonant units each tuned to a different frequency within the band of beat frequencies covering the operating range of the system, a pick-up device and means for moving it past said resonant circuits successively, a cathode ray tube, means for deflecting the cathode ray of said tube along a distance axis in synchronism with the relative movement of said pick-up device and resonant circuits, and means for supplying signal from said pick-up device to said cathode ray tube for acting upon the cathode ray to produce an indication.

4. A distance indicating system comprising means for transmitting a cyclically frequency modulated radio wave, means for receiving said wave after reflection from objects that are unknown distances from the transmitting means, a beat frequency detector, means for supplying to said detector both said reflected wave and a frequency modulated wave direct from the transmitting means whereby the detector output contains signals having beat frequencies corresponding to said unknown distances, and a multiple resonant frequency indicator connected to receive said detector output, said indicator comprising a plurality of series resonant circuits connected in parallel with each other and each tuned to a different frequency within the band of beat frequencies covering the operating range of the system, a pick-up coil and means for moving it past said resonant circuits successively, a cathode ray tube, means for deflecting the cathode ray of said tube along a distance axis in synchronism with the relative movement of said pick-up coil and resonant circuits, and means for supplying signal from said pick-up coil to said cathode ray tube for acting upon the cathode ray to produce an indication.

ROYDEN C. SANDERS, Jr.

REFERENCES CITED

The following references are of record in the file of this patent:

UNITED STATES PATENTS

| Number | Name | Date |
|---|---|---|
| 2,045,071 | Espenschied | June 23, 1936 |
| 2,164,161 | Nekolny | June 27, 1939 |
| 2,323,376 | Harvey | July 6, 1943 |